United States Patent
Otsuki et al.

(10) Patent No.: US 12,031,197 B2
(45) Date of Patent: Jul. 9, 2024

(54) HYDROGEN STORAGE MATERIAL, HYDROGEN STORAGE CONTAINER, AND HYDROGEN SUPPLY APPARATUS

(71) Applicant: SANTOKU CORPORATION, Kobe (JP)

(72) Inventors: Takayuki Otsuki, Kobe (JP); Hiroki Hayashi, Kobe (JP); Yoshiharu Takata, Kobe (JP); Noboru Nishigaki, Kobe (JP); Atsushi Sakuta, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 157 days.

(21) Appl. No.: 17/636,221
(22) PCT Filed: Aug. 7, 2020
(86) PCT No.: PCT/JP2020/030375
§ 371 (c)(1),
(2) Date: Feb. 17, 2022
(87) PCT Pub. No.: WO2021/033582
PCT Pub. Date: Feb. 25, 2021

(65) Prior Publication Data
US 2022/0282355 A1    Sep. 8, 2022

(30) Foreign Application Priority Data
Aug. 19, 2019 (JP) ................................ 2019-150014

(51) Int. Cl.
C22C 14/00 (2006.01)
C22C 21/04 (2006.01)
C22C 28/00 (2006.01)

(52) U.S. Cl.
CPC .............. *C22C 14/00* (2013.01); *C22C 21/04* (2013.01); *C22C 28/00* (2013.01); *C22C 2202/04* (2013.01)

(58) Field of Classification Search
None
See application file for complete search history.

(56) References Cited

U.S. PATENT DOCUMENTS

2010/0108543 A1*  5/2010  Tokiwa ................. F17C 11/005
                                                                502/402

FOREIGN PATENT DOCUMENTS

CN        105132741 A     12/2015
CN        105779848 A      7/2016
(Continued)

OTHER PUBLICATIONS

English language machine translation of CN 105132741A. Generated Sep. 15, 2023. (Year: 2023).*
(Continued)

*Primary Examiner* — Brian D Walck
(74) *Attorney, Agent, or Firm* — Sughrue Mion, PLLC

(57) ABSTRACT

A low-cost hydrogen storage material has hydrogen absorption (storage) and desorption properties suitable for hydrogen storage. A hydrogen storage container including the hydrogen storage material and a hydrogen supply apparatus including the hydrogen storage container are disclosed. The hydrogen storage material includes an alloy having a specific elemental composition represented by Formula (1), in which, in a 1000×COMP image of a cross section of the alloy obtained by EPMA, a plurality of phases enriched with R are present, the phases having phase diameters of 0.1 μm or more and 10 μm or less, and 100 or more sets of combinations of two phases in the phases are present in a visual field of 85 μm×120 μm in the COMP image, the shortest separation distance between the two phases being 0.5 to 20 μm.

[Chem. 1]

$$Ti_{(1-a-b)}R_a M1_b Fe_c Mn_d M2_e C_f \qquad (1)$$

19 Claims, 5 Drawing Sheets

(56) References Cited

FOREIGN PATENT DOCUMENTS

| EP | 2 110 411 A1 | 10/2009 |
| JP | 61-250136 A | 11/1986 |
| JP | 10-265875 A | 10/1998 |
| JP | 10-265888 A | 10/1998 |

OTHER PUBLICATIONS

International Search Report for PCT/JP2020/030375 dated Nov. 2, 2020.
Written Opinion for PCT/JP2020/030375 dated Nov. 2, 2020.
Haiyan Leng et al: "Effects of Ce on the hydrogen storage properties of $TiFe_{0.9}Mn_{0.1}$ alloy", International Journal of Hydrogen Energy, vol. 42, 2017, pp. 23731-23736, (6 pages).
Extended European Search Report dated Jul. 26, 2023 in EP Application No. 20853738.1.

* cited by examiner

HYDROGEN STORAGE MATERIAL, HYDROGEN STORAGE CONTAINER, AND HYDROGEN SUPPLY APPARATUS

CROSS REFERENCE TO RELATED APPLICATIONS

This application is a National Stage of International Application No. PCT/JP2020/030375 filed Aug. 7, 2020, claiming priority based on Japanese Patent Application No. 2019-150014 filed Aug. 19, 2019.

TECHNICAL FIELD

The present invention relates to a hydrogen storage material, a hydrogen storage container, and a hydrogen supply apparatus.

BACKGROUND ART

A hydrogen absorbing (storage) alloy is an alloy capable of reversibly absorbing and desorbing hydrogen and has already been used as a negative electrode material for nickel hydrogen secondary batteries. Recently, the hydrogen absorbing alloy has been expected as a material that can safely store hydrogen which has been attracted attention as an energy source, and research is also ongoing on the use of the hydrogen absorbing alloy in a hydrogen storage and supply system.

Various types of the hydrogen absorbing alloy exist such as the AB5-type, the AB2-type, the TiFe-type, and the BCC-type such as TiVCr, and among these, the TiFe-type alloys of which the raw materials are the most inexpensive are the most promising material for applications in hydrogen storage that requires far more amount of the hydrogen absorbing alloy than the amount used in batteries.

However, the TiFe-type alloys are not easy to activate and require a temperature of 400° C. or higher and a pressure of 3 MPa or higher for the initial activation. In addition, the two-step plateau region in the hydrogen pressure-composition isotherm (PCT curve) and large hysteresis are also issues to be solved for practical realization.

Various studies have been conducted up to this day in order to solve the issues that the TiFe-type alloys have.

Patent Literature 1 discloses a titanium-based hydrogen absorbing alloy represented by a rational formula $Ti_{1+k}Fe_{1-l}Mn_lA_m$ (where $0 \leq k \leq 0.3$, $0 < l \leq 0.3$, $0 < m \leq 0.1$, and A is at least one element selected from niobium and the rare earth elements).

Patent Literature 1 also discloses that an alloy that can be easily activated and has a sufficient amount of hydrogen absorption is obtained by adding Mn and the element A (at least one of Nb and the rare earth elements) to a TiFe alloy.

Patent Literature 2 discloses a hydrogen absorbing alloy formed of an alloy having a composition represented by a general formula $(T_{1-a}Fe_a)_{100-b-c-d}La_bM_cM'_d$ (where T is at least one element selected from Ti, Zr, and Hf, M is at least one element selected from V, Nb, Ta, Cr, Mo, and W, M' is at least one element selected from Mn, Co, Ni, Cu, Zn, B, Al, Ge, and Sn, a is an atomic ratio satisfying $0.45 \leq a \leq 0.55$, and b, c, and d are atom % satisfying $0.01 \leq b \leq 10$, $0 \leq c \leq 20$, and $0 \leq d \leq 30$, respectively), in which a microcrystalline phase having a crystal grain size of 10 μm or less precipitates in at least a part of the alloy composition.

Patent Literature 2 also discloses that a hydrogen absorbing alloy having excellent hydrogen absorption properties and corrosion resistance is obtained by appropriately setting the types of the elements constituting the T component, Fe, the La component, the M component, and the M' component in the general formula and a composition ratio of each component, performing solidification by cooling, and then performing a heat treatment, thereby precipitating a microcrystalline phase.

Patent Literature 3 discloses a hydrogen absorbing alloy formed of an alloy having a composition represented by a general formula $A_aT_bM_cM'_d$ (where A is at least one element selected from Ti, Zr, Hf, and V, T is at least one element selected from Ni, Co, Fe, Cu, Mn, and Cr, M is at least one element selected from Al, Si, Ga, Ge, Zn, Sn, In, and Sb, M' is at least one element selected from B, C, N, and P, a, b, c, and d are atom % satisfying $20 \leq a \leq 70$, $30 \leq b \leq 60$, $5 \leq c \leq 40$, and $0.1 \leq d \leq 10$, respectively, and $a+b+c+d=100$), in which a microcrystalline phase having a crystal grain size of 10 μm or less precipitates in at least a part of the alloy composition.

Patent Literature 3 also discloses that a hydrogen absorbing alloy having excellent hydrogen absorption properties and corrosion resistance is obtained by appropriately setting the types of the elements constituting the A component, the T component, the M component, and the M' component in the general formula and a composition ratio of each component, performing solidification by cooling, and then performing a heat treatment, thereby precipitating a microcrystalline phase.

CITATION LIST

Patent Literature

Patent Literature 1: JP S61-250136 A
Patent Literature 2: JP H10-265875 A
Patent Literature 3: JP H10-265888 A

SUMMARY OF INVENTION

Technical Problem

However, it is considered that flatness of the plateau region is not sufficient in the hydrogen pressure-composition isotherm (hereinafter, may be referred to as the PCT curve) disclosed in Patent Literature 1, and further improvement is necessary for practical realization.

Furthermore, the purposes of the inventions of Patent Literature 2 and Patent Literature 3 are to improve the properties which are necessary for use in negative electrodes of batteries, and it is considered that hydrogen absorption and desorption properties of the alloys (equilibrium pressure, plateau flatness, hysteresis, and the like) are not suitable for hydrogen storage.

Thus, an object of the present invention is to provide a low-cost hydrogen storage material having hydrogen absorption (storage) and desorption properties suitable for hydrogen storage. Specifically, an object of the present invention is to provide a hydrogen storage material which has a large hydrogen absorption (storage) amount, is capable of absorbing and desorbing hydrogen within a temperature range of normal temperature to 95° C., and has excellent plateau flatness.

Furthermore, an object of the present invention is to provide a hydrogen storage container including a low-cost hydrogen storage material having the hydrogen absorption and desorption properties suitable for hydrogen storage and a hydrogen supply apparatus including the hydrogen storage container.

Solution to Problem

As a result of conducting diligent studies in order to solve the above problems, the present inventors found an alloy having a specific elemental composition containing Ti, a rare earth element, and Fe, thus completing the present invention.

That is, according to the present invention, provided is a hydrogen storage material including an alloy having an elemental composition represented by the following Formula (1), in which, in a 1000×COMP image of a cross section of the alloy obtained by EPMA, a plurality of phases enriched with R are present, the phases having phase diameters of 0.1 μm or more and 10 μm or less, and 100 or more sets of combinations of two phases in the phases are present in a visual field of 85 μm×120 μm in the COMP image, the shortest separation distance between the two phases being 0.5 to 20 μm,

[Chem. 1]

$$Ti_{(1-a-b)}R_aM1_bFe_cMn_dM2_eC_f \quad (1)$$

where R is at least one selected from the rare earth elements and contains Ce as an essential element. M1 is at least one selected from the group consisting of the group 4 elements and the group 5 elements in the periodic table, M2 is at least one selected from the transition metal elements (excluding M1, Ti, Fe, and Mn), Al, B, Ga, Si, and Sn. Here, the rare earth elements include Sc and Y. a satisfies 0.003≤a≤0.15, b satisfies 0≤b≤0.20, c satisfies 0.40≤c≤1.15, d satisfies 0.05≤d≤0.40, e satisfies 0≤e≤0.20, f satisfies 0≤f≤0.07, and c+d+e satisfies 0.60≤c+d+e≤1.20.

According to the invention of another aspect of the present invention, provided are a hydrogen storage container including the hydrogen storage material and a hydrogen supply apparatus including the hydrogen storage container.

Advantageous Effects of Invention

Since the hydrogen storage material of the present invention has the alloy having the specific elemental composition and forms a specific phase structure, the material has excellent hydrogen absorption and desorption properties and can be suitably used for hydrogen storage.

DESCRIPTION OF EMBODIMENTS

Hereinafter, the present invention will be described in detail.

A hydrogen storage material of the present invention is a material having an alloy with an elemental composition represented by the following Formula (1). The hydrogen storage material is preferably a material formed of the alloy.

[Chem. 2]

$$Ti_{(1-a-b)}R_aM1_bFe_cMn_dM2_eC_f \quad (1)$$

[In Formula (1), R is at least one selected from the rare earth elements and contains Ce as an essential element. M1 is at least one selected from the group consisting of the group 4 elements and the group 5 elements in the periodic table, M2 is at least one selected from the transition metal elements (excluding M1, Ti, Fe, and Mn), Al, B, Ga, Si, and Sn. Here, the rare earth elements include Sc and Y. a satisfies 0.003≤a≤0.15, b satisfies 0≤b≤0.20, c satisfies 0.40≤c≤1.15, d satisfies 0.05≤d≤0.40, e satisfies 0≤e≤0.20, f satisfies 0≤f≤0.07, and c+d+e satisfies 0.60≤c+d+e≤1.20.] The element M1 in Formula (1) is preferably at least one selected from the group consisting of V, Zr, Nb, and Ta.

In Formula (1), a, b, c, d, e, and f represent content ratios of the respective elements, and detailed description thereof is as follows. Hereinafter, the content ratio may be referred to as a "content" or an "amount".

R in Formula (1) is at least one selected from the rare earth elements and contains Ce as an essential element. Here, the rare earth elements include scandium (Sc) and yttrium (Y). Accordingly, examples of R include Sc, Y, La, Ce, Pr, Nd, Pm, Sm, Eu, Gd, Tb, Dy, Ho, Er, Tm, Yb, and Lu. Among these, preferred rare earth elements other than Ce are La, Pr, Nd, and Sm, and R may contain these elements in addition to Ce. R is effective in increasing the absorption amount, raising the equilibrium pressure during hydrogen absorption or desorption, and resolving the two-step plateau in the PCT curve. a, which represents the content of R in Formula (1), satisfies 0.003≤a≤0.15. The lower limit of a is preferably 0.005≤a, and the upper limit of a is preferably a≤0.10 and more preferably a≤0.08.

M1 in Formula (1) is at least one selected from the group consisting of the group 4 elements and the group 5 elements in the periodic table, and is preferably at least one selected from the group consisting of V, Zr, Nb, and Ta. Although M1 is not necessarily essential, it is an element that mainly contributes to the adjustment of various properties. For example, M1 can be included in the alloy when a condition of using the material during hydrogen storage requires fine adjustment of properties. b, which represents the content of M1 in Formula (1), satisfies 0≤b≤0.20 and preferably satisfies 0≤b≤0.05.

c in Formula (1) represents the content of Fe. c satisfies 0.40≤c≤1.15. The lower limit of c is preferably 0.50≤c and more preferably 0.55≤c, and the upper limit of c is preferably c≤0.90 and more preferably c≤0.85. When the amount of Fe in a TiFe-type alloy is large, and c is greater than 1.15, initial activation becomes difficult, and it may be impossible to obtain a sufficient hydrogen absorption amount when the alloy is used as the hydrogen storage material. When the amount of Fe in the TiFe-type alloy is small, and c is less than 0.40, the hydrogen absorption amount decreases, and the hydrogen absorption or desorption equilibrium pressure becomes too low. Thus, the alloy may not effectively function when used as the hydrogen storage material.

d in Formula (1) represents the content of Mn. d satisfies $0.05 \leq d \leq 0.40$. The lower limit of d is preferably $0.10 \leq d$ and more preferably $0.12 \leq d$, and the upper limit of d is preferably $d \leq 0.30$ and more preferably $d \leq 0.28$. When the amount of Mn in the TiFe-type alloy is large, and d is greater than 0.40, the hydrogen absorption or desorption equilibrium pressure becomes too low, and hydrogen may not be effectively utilized when the alloy is used as the hydrogen storage material. When the amount of Mn in the TiFe-type alloy is small, and d is less than 0.05, the initial activation becomes difficult, and it may be impossible to obtain a sufficient hydrogen absorption amount when the alloy is used as the hydrogen storage material.

M2 in Formula (1) is at least one selected from the transition metal elements (excluding M1, Ti, Fe, and Mn), Al, B, Ga, Si, and Sn. M2 is preferably at least one selected from Co, Ni, Cu, Cr, Al, B, Ga, Si, and Sn. Although M2 is not necessarily essential, it is an element that mainly contributes to the adjustment of various properties. For example, M2 can be included in the alloy when a condition of using the material during hydrogen storage requires fine adjustment of properties. e, which represents the content of M2 in Formula (1), satisfies $0 \leq e \leq 0.20$ and preferably satisfies $0 \leq e \leq 0.10$.

f in Formula (1) represents the content of carbon (C). f satisfies $0 \leq f \leq 0.07$. The lower limit of f is preferably $0.001 \leq f$, and the upper limit of f is preferably $f \leq 0.05$ and more preferably $f \leq 0.035$. C is effective in raising the equilibrium pressure during hydrogen absorption or desorption and resolving the two-step plateau in the PCT curve.

As described above, both R and C in Formula (1) are effective in raising the equilibrium pressure during hydrogen absorption or desorption and resolving the two-step plateau in the PCT curve, and the effects can be greater when these elements are combined. It is preferable that, in Formula (1), f satisfies $0.001 \leq f$, and a+f satisfies $0.005 \leq a+f \leq 0.11$.

c+d+e in Formula (1) represents the sum of the contents of Fe, Mn, and M2. The value of c+d+e affects the activation and the equilibrium pressure of the hydrogen storage material of the present invention, and by adjusting the value to be within the following range, the initial activation of the alloy can be rendered easy, while maintaining the equilibrium pressure required for the hydrogen storage. c+d+e satisfies $0.60 \leq c+d+e \leq 1.20$. The lower limit of c+d+e is preferably $0.70 \leq c+d+e$ and more preferably $0.80 \leq c+d+e$, and the upper limit of c+d+e is preferably $c+d+e \leq 1.10$ and more preferably $c+d+e \leq 1.00$.

The elemental composition of the alloy of the present invention, which is represented by Formula (1), can be confirmed by quantitative analysis using an Inductively Coupled Plasma (ICP) analysis apparatus. In the present specification, unless specified otherwise, the alloy of the present invention refers to the alloy having the elemental composition represented by Formula (1).

The alloy of the present invention has the following structural features. That is, in a 1000×COMP image of a cross section of the alloy obtained by an Electron Probe Micro Analyzer (EPMA), a plurality of phases enriched with R are present, the phases having phase diameters of 0.1 μm or more and 10 μm or less, and 100 or more sets of combinations of two phases in the phases are present in a visual field of 85 μm×120 μm in the COMP image, the shortest separation distance between the two phases being 0.5 to 20 μm.

The cross section of the alloy herein refers to a cross section formed by curing a normal temperature curable-type resin (for example, an epoxy resin) in which the alloy is embedded, performing lapping and precision polishing on the resin with a wet polishing machine, and finally mirror finishing the polished surface. Note that, when forming the cross section, the size of the alloy is not particularly limited. For example, an alloy flake of about 1 cm$^2$ or an alloy slab of about 1 cm$^3$ may be used.

When the cross section of the alloy of the present invention formed in this manner is observed, a sea-island structure that a plurality of phases enriched with R are present in a main phase of the TiFe-type alloy is formed.

Although the detailed mechanism is unclear, the above-described dispersion of the phases enriched with R, which are the islands, in the main phase of the TiFe-type alloy, which is the sea, allows the absorption and desorption of hydrogen which is repeatedly carried out to be satisfactorily performed.

The main phase of the TiFe-type alloy is a phase mainly having the TiFe phase (may contain a substituting element such as Mn). Hereinafter, the main phase of the TiFe-type alloy may be simply referred to as the main phase.

In addition, the phases enriched with R are phases which are mostly formed of the element R, and the phases may contain carbon (C) (may contain a small amount of another added element). Hereinafter, the phases enriched with R may be simply referred to as the R-enriched phases.

Figure 1:
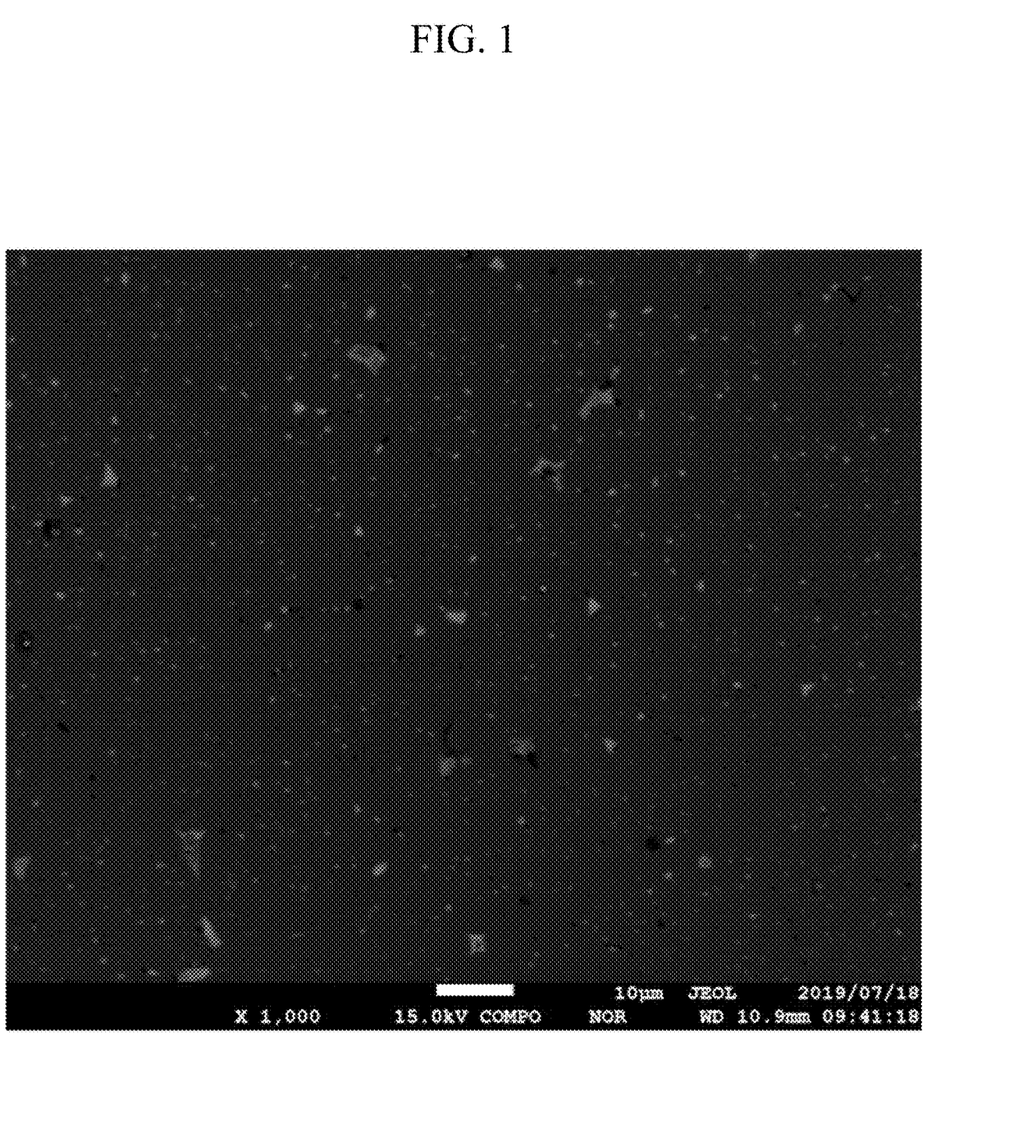
FIG. 1 is a diagram showing a photograph of a COMP image of a cross section of an alloy slab after a heat treatment in Example 1.

In the observation of the visual field of the cross section, the R-enriched phases are dispersed in the main phase as fine islands in the form shown in FIG. 1, and the phase diameters thereof are within the range of about 0.1 to 10 μm.

Each element contained in the main phase and the R-enriched phases can be confirmed from a mapping image of the element obtained by surface analysis using EPMA.

Here, the phase diameter is a value obtained by measuring the major axis and the minor axis of the R-enriched phase and calculating the calculation formula "(major axis+minor axis)/2".

Regarding the combination of two R-enriched phases, one phase (island) is selected, and among the phases (islands) that are in the vicinity of the selected phase, the phase (island) with the shortest separation distance from the selected phase is selected, whereby the selected phases are designated as one set. The shortest separation distance refers to the shortest linear distance between the outer circumferences of the two phases.

In a case where the alloy of the present invention contains carbon (C), a relatively large amount C is contained in the R-enriched phases. Although the detailed mechanism is unclear, it is considered that the effects of raising the equilibrium pressure during hydrogen absorption or desorption and resolving the two-step plateau in the PCT curve can be greater when C is contained in the R-enriched phases dispersed as described above.

Though there is no particular upper limit in the number of the combinations of two R-enriched phases with the shortest separation distance of 0.5 to 20 μm therebetween, about 1500 sets of the combinations in the visual field of 85 μm× 120 μm in the COMP image is practically the upper limit.

It is preferable that, in the hydrogen pressure-composition isotherm (PCT curve) for the alloy of the present invention at 30° C., a hydrogen absorption pressure $P_{a1}$ at 0.3 wt % (weight %) of hydrogen and a hydrogen absorption pressure $P_{a2}$ at 1.3 wt % of hydrogen satisfy a relationship of $0 \leq \log_{10}(P_{a2}) - \log_{10}(P_{a1}) \leq 0.45$, and a hydrogen desorption pressure $P_{b1}$ at 0.3 wt % of hydrogen and a hydrogen desorption pressure $P_{b2}$ at 1.3 wt % of hydrogen satisfy a relationship of $0 \leq \log_{10}(P_{b2}) - \log_{10}(P_{b1}) \leq 0.45$. Such features of the PCT curve are preferable, since having these features allows the absorption and desorption of hydrogen to become easier, by which a very suitable hydrogen storage material can be obtained.

The relationships of the two formulas are used as indices of "plateau flatness", the former being the index of "plateau flatness during hydrogen absorption", and the latter being the index of "plateau flatness during hydrogen desorption".

When the relationship between the hydrogen absorption pressures in the absorption curve of the PCT curve satisfies the formula, a desired hydrogen absorption amount is easily reached within a relatively short period of time, which is advantageous. Furthermore, when the relationship between the hydrogen desorption pressures in the desorption curve of the PCT curve satisfies the formula, the required hydrogen pressure is easily maintained, and the amount of hydrogen that can be actually used can be secured as much as possible at the hydrogen supply destination, which are advantageous.

$P_{b1}$ is preferably 0.02 MPa or higher, more preferably 0.07 MPa or higher, and particularly preferably 0.10 MPa or higher. Such pressure ranges are preferable, since hydrogen desorption within a temperature range of normal temperature to 95° C. becomes more favorable. Though there is no particular upper limit in $P_{b1}$, the upper limit is practically about 1.00 MPa.

It is particularly preferable that the entire alloy of the present invention which forms the hydrogen storage material of the present invention satisfies the relationships in the PCT curve, however, a part of the alloy may satisfy the relationships.

Next, a method for producing the hydrogen storage material of the present invention will be described.

First, examples of a method for preparing the alloy include a strip casting method such as a single roll method, a twin roll method, and a disk method, and a permanent mold casting method.

For example, in the strip casting method, raw materials blended so that the alloy has a desired composition are prepared. The blended raw materials are then melted by heating in an inert gas atmosphere such as Ar to obtain a molten alloy, and the molten alloy is rapidly cooled and solidified by being poured on a water-cooled copper roll, thereby obtaining an alloy slab. As for the water-cooled copper roll, a water-cooled copper roll having a coating layer containing Ni or Cr on the surface thereof can be used. Furthermore, in the permanent mold casting method, a molten alloy is obtained in the same manner, and then the molten alloy is poured into a water-cooled copper mold to be cooled and solidified, whereby an ingot is obtained. Cooling rates are different in the strip casting method and the permanent mold casting method, and the strip casting method is generally preferable in a case of obtaining an alloy with less segregation and uniform composition distribution. The alloy of the present invention includes, apart from the main phase of the TiFe-type alloy, the fine R-enriched phases dispersed therein, however, it is preferable that a composition distribution in the part of the main phase of the TiFe-type alloy other than the R-enriched phases is uniform. Therefore, the strip casting method is a preferred method in the present invention as well. In addition, the TiFe-type alloy is extremely hard and not easy to grind, which is also a reason why the strip casting method is preferable.

Note that, in order to control the number of sets of the "combinations of two R-enriched phases" according to the present invention to the number of the present invention, the cooling rate of the molten alloy is controlled as follows when producing the alloy slab.

In other words, the cooling rate until the alloy temperature reaches 950° C. from a temperature at which the cooling of the molten alloy begins (for example, a temperature at the time when the molten metal contacts the roll) is set to 300° C./sec or more. The cooling rate is preferably 700° C./sec or more, more preferably 1000° C./sec or more, and particularly preferably 1500° C./sec or more. Though there is no particular upper limit in the cooling rate, the upper limit is practically about 10000° C./sec or less. The temperature at which the cooling of the molten alloy begins is within a range of about 1300 to 1500° C., though the temperature varies depending on the alloy composition.

The cooling rate below 950° C. is not particularly limited, and for example, in a case of the strip casting method, the alloy may be collected at, for example, 100° C. or lower, by being allowed to cool after being detached from the roll.

Furthermore, in order to obtain an alloy in which the main phase part of the TiFe-type alloy has a more uniform composition distribution, it is preferable that the alloy slab obtained by the cooling is subjected to a heat treatment.

The heat treatment can be performed within a range of 700° C. or higher and 1250° C. or lower in an inert gas atmosphere such as Ar. The heat treatment temperature is preferably 900° C. or higher and 1150° C. or lower, and heat treatment time is 2 hours or more and less than 48 hours, preferably, 4 hours or more and less than 24 hours.

Next, the alloy slab obtained by the casting is ground so as to obtain an alloy powder. The grinding can be performed using a known grinder. A particle size of the alloy powder is preferably 800 μm or less and more preferably 500 μm or less. Though it is not necessary to specifically define the lower limit of the particle size of the alloy powder, the lower limit is practically about 0.1 μm. Here, the particle size of the alloy powder refers to a diameter measured by a sieve shaker (Ro-Tap).

The hydrogen storage material of the present invention may be such powderized alloy or a composite obtained by mixing the alloy powder with a resin or the like and molding the mixture into an arbitrary form such as a granular form. In this case, the resin functions as a binder for the alloy powder. The mixing can be performed by a known method. For example, the mixing can be performed using a mortar or using a rotary mixer such as a double cone rotary mixer and a V-type rotary mixer, a stirring mixer such as a blade-type stirring mixer and a screw-type stirring mixer, or the like.

It is also possible to perform the mixing while grinding the alloy slab and the binder using a grinder such as a ball mill and an attritor mill.

A hydrogen storage container of the present invention includes the hydrogen storage material produced as describe above, and as for the material and shape of the container, a known material and shape can be used.

A hydrogen supply apparatus of the present invention includes the hydrogen storage container, and as for other configurations, known configurations can be used.

EXAMPLES

Hereinafter, the present invention will be described in detail with reference to Examples and Comparative Examples, but the present invention is not limited thereto. In the descriptions of Examples, the alloy of the present invention in Examples and alloys in Comparative Examples that are not the alloys of the present invention are all referred to as an "alloy". In addition, an alloy obtained in a shape of a slab by the strip casting method is referred to as an alloy slab, and a product obtained by grinding the alloy slab is referred to as an alloy powder.

Example 1

Metal raw materials were weighed so that an alloy to be finally obtained had the elemental composition shown in Table 1 and melted in a high frequency melting furnace in an argon gas (Ar) atmosphere, thereby obtaining a molten alloy. The molten alloy was rapidly cooled and solidified by subjecting the molten alloy to a strip casting method at a pouring temperature of 1450° C. using a single roll casting apparatus which used a water-cooled copper roll, and an alloy slab with an average thickness of 0.5 mm was thus obtained.

A temperature at which the cooling of the molten alloy began, that is, a temperature at the time when the molten alloy contacted the water-cooled copper roll, was about 1400° C. A difference existed in the cooling rate between the side of the molten alloy that contacted the roll and the side that did not contact the roll, and the cooling rate from 1400° C. to 950° C. was between 2000° C./sec and 3000° C./sec.

The alloy slab obtained above was subjected to a heat treatment by being kept in a heat treatment furnace in an Ar atmosphere at 1100° C. for 6 hours. After the heat treatment, the alloy slab was embedded in an epoxy resin, the resin was cured and subjected to lapping and precision polishing using a wet polishing machine, and finally the polished surface was mirror finished, thereby forming a cross section of the alloy. Surface analysis (a COMP image and a mapping image of each element) was performed on the cross section using EPMA (manufactured by JEOL Ltd., trade name: JXA8800) under conditions of a magnification of 1000×, an acceleration voltage of 15 kV, a current of $1\times10^{-7}$ A, and a beam diameter of 1 µm.

In a visual field of 85 µm×120 µm in the COMP image, the number of combinations of two R-enriched phases with phase diameters of 0.1 to 10 µm and the shortest separation distance of 0.5 to 20 µm was counted visually. The counted number will be referred to as a "degree of R-enriched phase dispersion" The results are shown in Table 1.

Figure 3:
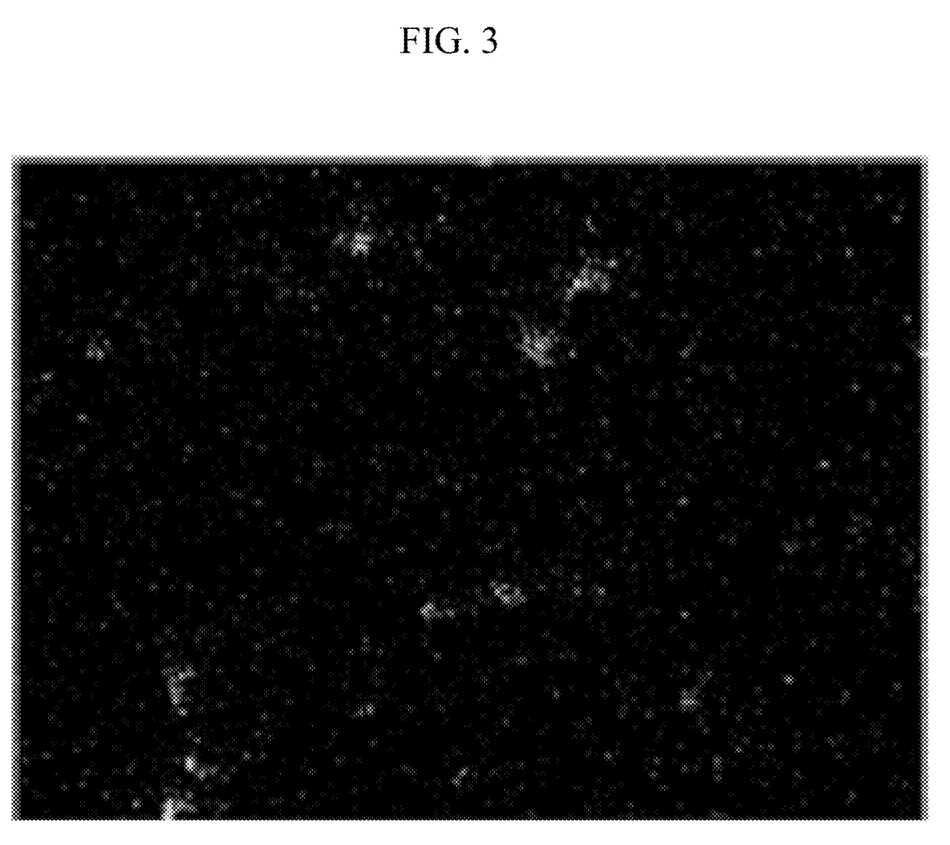
FIG. 3 is a diagram showing a photograph of a La mapping image of the cross section of the alloy slab after the heat treatment in Example 1.
Figure 4:
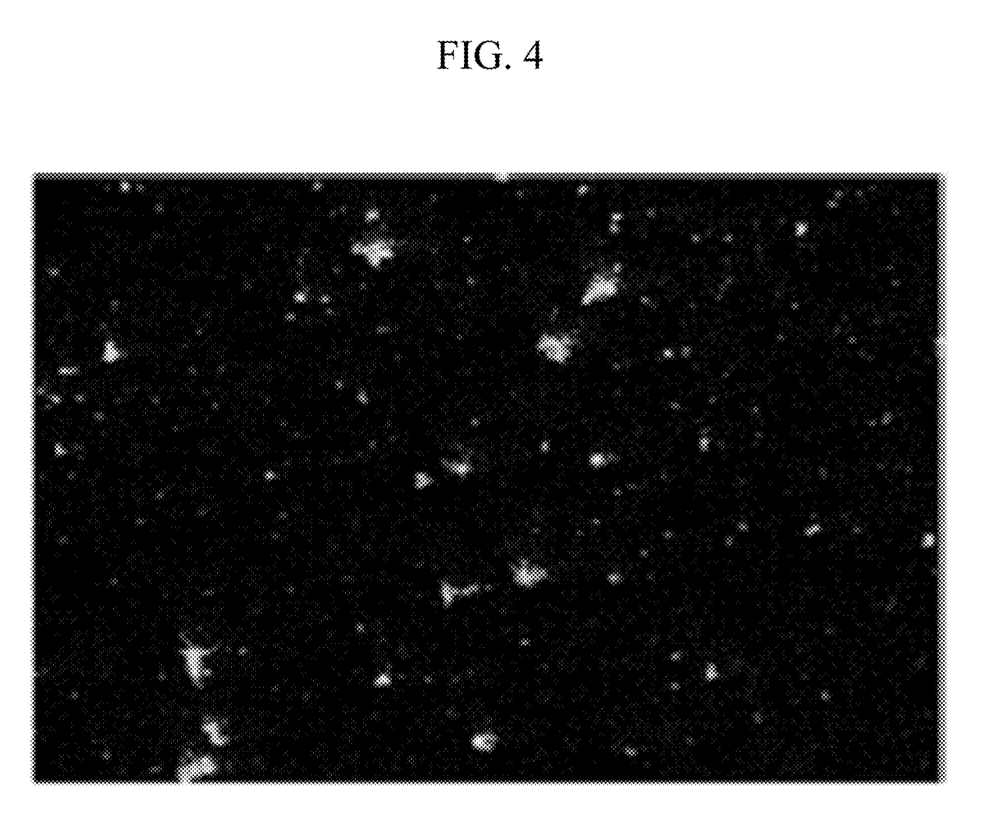
FIG. 4 is a diagram showing a photograph of a Ce mapping image of the cross section of the alloy slab after the heat treatment in Example 1.

In addition, a photograph of the COMP image of the cross section of the alloy is shown in FIG. 1. Furthermore, a photograph of a La mapping image is shown in FIG. 3, and a photograph of a Ce mapping image is shown in FIG. 4.

After the heat treatment, the alloy slab was also ground using a stainless-steel mortar, and an alloy powder with a particle size of 500 µm pass was obtained using a sieve having an opening size of 500 µm.

Figure 5:
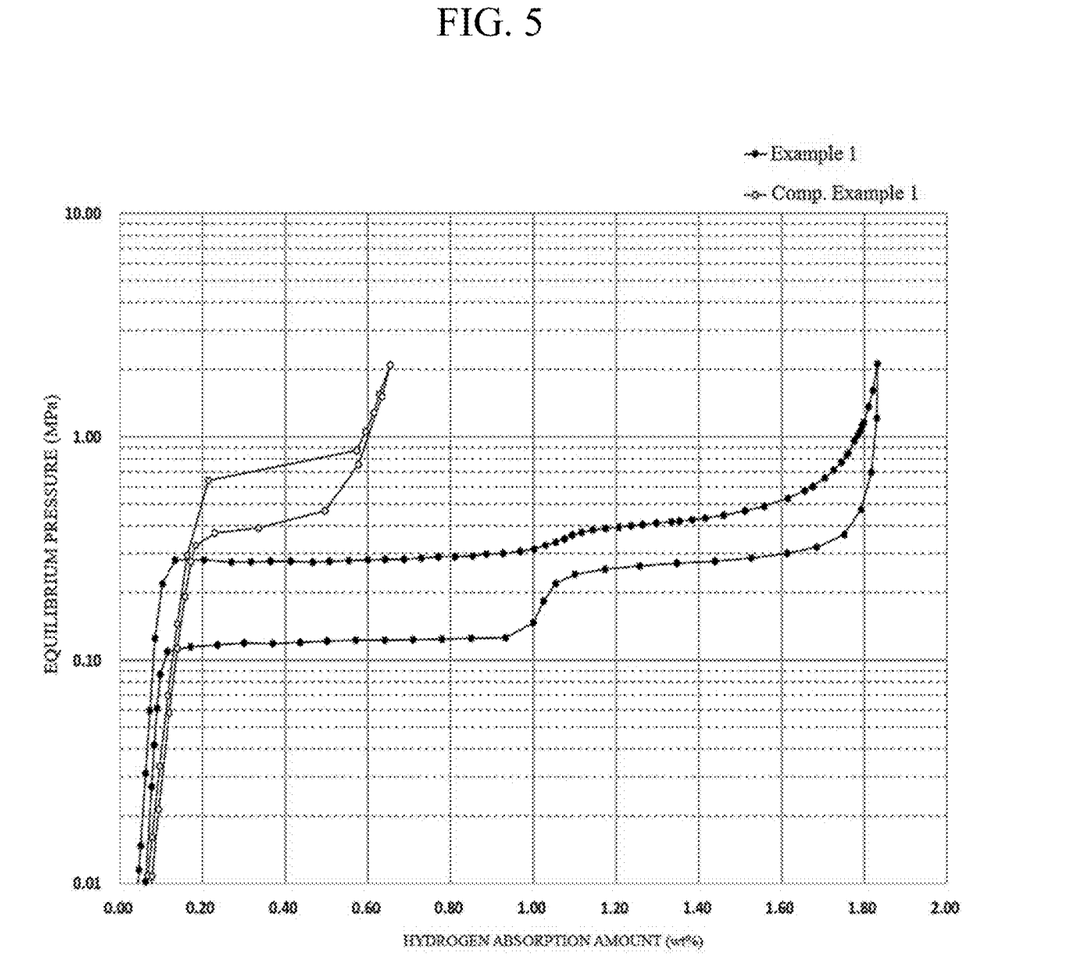
FIG. 5 shows hydrogen pressure-composition isotherms (PCT curves) of the alloy slab after the heat treatment in Example 1 and an alloy slab after a heat treatment in Comparative Example 1 at 30° C.

PCT curves were obtained by measuring hydrogen absorption and desorption properties of the obtained alloy powder using an automatic high pressure Sieverts apparatus for PCT measurement (manufactured by Fuse Technonet Co., LTD.). Before the measurement, vacuum drawing was first performed at 80° C. for 1 hour, and then pressurization was performed at a hydrogen pressure of about 2.5 MPa, and finally hydrogen was absorbed until the hydrogen pressure stabilized at 0° C. Then, activation was performed by carrying out an operation of vacuum drawing at 80° C. for 0.5 hours twice. Next, hydrogen absorption and desorption equilibrium pressures were measured by varying the hydrogen pressure between 0.01 MPa and 2.0 MPa at 30° C. The hydrogen pressure-composition isotherms (PCT curves) are shown in FIG. 5.

The results of reading, from the obtained PCT curves, the hydrogen absorption amount at a pressure of 1.0 MPa and the hydrogen desorption pressure at 0.3 wt % of hydrogen are shown in Table 1. In addition, the results of calculating plateau flatness during hydrogen absorption and during hydrogen desorption are shown in Table 1 as well.

As the index of the plateau flatness in the PCT curve, for the absorption, a value obtained by reading the values of an absorption pressure $P_{a1}$ at 0.3 wt % of hydrogen and an absorption pressure $P_{a2}$ at 1.3 wt % of hydrogen from the PCT curve and calculating $\log_{10}(P_{a2})-\log_{10}(P_{a1})$ was used. For the desorption, a value obtained by reading the values of a desorption pressure $P_{b1}$ at 0.3 wt % of hydrogen and a desorption pressure $P_{b2}$ at 1.3 wt % of hydrogen from the PCT curve and calculating $\log_{10}(P_{b2})-\log_{10}(P_{b1})$ was used as the index. The results are shown in Table 1.

Examples 2 to 11

An alloy slab and an alloy powder of each Example were prepared in the same manner as in Example 1, except that an elemental composition of the finally obtained alloy and heat treatment conditions were changed to those shown in Table 1, and the surface analysis of a cross section of the alloy and the measurement of a degree of R-enriched phase dispersion and hydrogen absorption and desorption properties (plateau flatness and the like) were performed. Pouring temperatures, temperatures at which the cooling began, and cooling rates of molten alloys of these Examples were 1450° C., 1400° C., and between 2000° C./sec and 3000° C./sec, respectively, which were approximately the same as those in Example 1. The results are shown in Table 1.

Comparative Examples 1 to 7

An alloy slab and an alloy powder of each Comparative Example were prepared in the same manner as in Example 1, except that an elemental composition of the finally obtained alloy and heat treatment conditions were changed to those shown in Table 1, and the surface analysis of a cross section of the alloy and the measurement of a degree of R-enriched phase dispersion and hydrogen absorption and desorption properties (plateau flatness and the like) were performed. Pouring temperatures, temperatures at which the cooling began, and cooling rates of molten alloys of these Comparative Examples were 1450° C., 1400° C., and between 2000° C./sec and 3000° C./sec, respectively, which were approximately the same as those in Example 1. The results are shown in Table 1.

Figure 2:
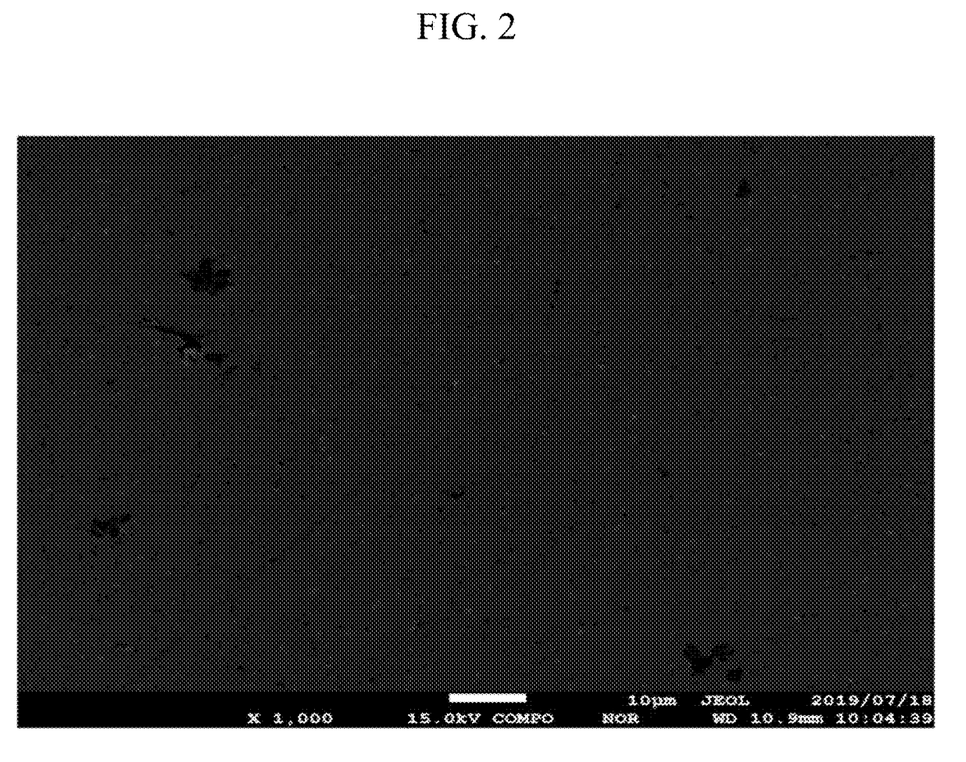
FIG. 2 is a diagram showing a photograph of a COMP image of a cross section of an alloy slab after a heat treatment in Comparative Example 7.

A photograph of a COMP image of a cross section of the alloy of Comparative Example 7 is shown in FIG. 2. When the photograph is shown as the figure, the sea-island structure becomes unclear, and the degree of R-enriched phase dispersion is also less than the lower limit of the present invention. The hydrogen pressure-composition isotherms (PCT curves) of Comparative Example 1 are shown in FIG. 5.

TABLE 1

| | Composition (molar ratio) | | | | | | | | Heat treatment | Hydrogen absorption amount (wt %) at 1.0 Mpa |
|---|---|---|---|---|---|---|---|---|---|---|
| | Ti | La | Ce | V | Zr | Fe | Mn | C | | |
| Example 1 | 0.975 | 0.004 | 0.021 | — | — | 0.789 | 0.152 | 0.015 | 1100° C. × 6 h | 1.78 |
| Example 2 | 0.975 | 0.004 | 0.021 | — | — | 0.789 | 0.152 | 0.015 | 1025° C. × 6 h | 1.76 |
| Example 3 | 0.975 | 0.004 | 0.021 | — | — | 0.789 | 0.152 | 0.015 | 950° C. × 6 h | 1.74 |
| Example 4 | 0.975 | 0.004 | 0.021 | — | — | 0.789 | 0.152 | 0.029 | 1100° C. × 6 h | 1.63 |
| Example 5 | 0.975 | 0.004 | 0.021 | — | — | 0.789 | 0.152 | — | 1100° C. × 6 h | 1.83 |
| Example 6 | 0.945 | 0.015 | 0.040 | — | — | 0.789 | 0.152 | 0.015 | 1100° C. × 6 h | 1.32 |
| Example 7 | 0.945 | 0.015 | 0.040 | — | — | 0.789 | 0.152 | — | 1100° C. × 6 h | 1.62 |
| Example 8 | 0.895 | 0.015 | 0.040 | 0.050 | — | 0.789 | 0.152 | — | 1100° C. × 6 h | 1.45 |
| Example 9 | 0.945 | 0.015 | 0.040 | — | — | 0.789 | 0.152 | — | Not performed | 1.62 |
| Example 10 | 0.970 | 0.004 | 0.021 | — | 0.005 | 0.789 | 0.152 | 0.003 | 1100° C. × 6 h | 1.80 |
| Example 11 | 0.985 | 0.002 | 0.013 | — | — | 0.806 | 0.187 | 0.004 | 1100° C. × 6 h | 1.75 |
| Comparative Example 1 | 1.000 | — | — | — | — | 0.750 | 0.250 | — | 1100° C. × 6 h | 0.59 |
| Comparative Example 2 | 0.845 | 0.051 | 0.104 | — | — | 0.789 | 0.152 | — | 1100° C. × 6 h | 1.07 |
| Comparative Example 3 | 0.745 | 0.087 | 0.168 | — | — | 0.789 | 0.152 | — | 1100° C. × 6 h | 0.70 |
| Comparative Example 4 | 0.992 | 0.008 | — | — | — | 0.800 | 0.155 | 0.034 | 1100° C. × 6 h | 0.68 |
| Comparative Example 5 | 0.994 | 0.006 | — | — | — | 0.775 | 0.150 | — | Not performed | 1.82 |
| Comparative Example 6 | 0.994 | 0.006 | — | — | — | 0.775 | 0.150 | — | 1100° C. × 6 h | 1.85 |
| Comparative Example 7 | 0.992 | 0.008 | — | — | — | 0.800 | 0.155 | 0.016 | 1100° C. × 6 h | 1.33 |

| | Hydrogen desorption pressure (Mpa) at 0.3 wt % | Plateau flatness | | Degree of R-enriched phase dispersion (number of combinations) |
|---|---|---|---|---|
| | | During absorption | During desorption | |
| Example 1 | 0.119 | 0.17 | 0.35 | 311 |
| Example 2 | 0.115 | 0.20 | 0.37 | 224 |
| Example 3 | 0.115 | 0.26 | 0.35 | 363 |
| Example 4 | 0.165 | 0.21 | 0.40 | 135 |
| Example 5 | 0.083 | 0.16 | 0.35 | 210 |
| Example 6 | 0.255 | 0.23 | 0.19 | 384 |
| Example 7 | 0.133 | 0.23 | 0.39 | 390 |
| Example 8 | 0.173 | 0.26 | 0.37 | 460 |
| Example 9 | 0.115 | 0.40 | 0.44 | 480 |
| Example 10 | 0.070 | 0.22 | 0.39 | 332 |
| Example 11 | 0.105 | 0.25 | 0.38 | 106 |
| Comparative Example 1 | 0.380 | Cannot be calculated* | Cannot be calculated* | — |
| Comparative Example 2 | 0.230 | Cannot be calculated* | Cannot be calculated* | 30 |
| Comparative Example 3 | 0.299 | Cannot be calculated* | Cannot be calculated* | 194 |
| Comparative Example 4 | 0.165 | Cannot be calculated* | Cannot be calculated* | 32 |
| Comparative Example 5 | 0.040 | 0.56 | 0.60 | 26 |
| Comparative Example 6 | 0.041 | 0.38 | 0.55 | 20 |
| Comparative Example 7 | 0.115 | 0.52 | 0.48 | 89 |

*The hydrogen absorption amount did not satisfy the prescription (1.3 wt %) required for the calculation As is clear from the table, the alloy of each Example shows a sufficient hydrogen absorption amount compared to the alloy of each Comparative Example. Furthermore, almost all hydrogen desorption pressures at 0.3 wt % of hydrogen are 0.1 MPa or higher, and hydrogen can be absorbed and desorbed within a temperature range of normal temperature to 95° C. Moreover, it can be understood that the plateau flatness in the PCT curves was satisfactory, and excellent hydrogen storage materials are obtained.

What is claimed is:
1. A hydrogen storage material comprising:
an alloy having an elemental composition represented by the following Formula (1),
wherein an analysis of an elemental compositional image at 1000 times magnification (1000×COMP image) of a cross section of the alloy, shows a plurality of phases enriched with R (R-enriched phases), said R-enriched phases having a phase diameter of 0.1 μm or more and 10 μm or less,
wherein the 1000×COMP image is obtained by an electron probe micro analyzer (EPMA),
wherein the plurality of R-enriched phases comprise 100 or more sets of combinations of a first and a second R-enriched phases within a visual field of 85 μm×120 μm in the 1000×COMP image, and
wherein the second R-enriched phase has a shortest separation distance from the first R-enriched phase, said shortest separation distance between the first and the second R-enriched phases being 0.5 to 20 μm,
[Formula (1)]

$$Ti_{(1-a-b)}R_aM1_bFe_cMn_dM2_eC_f \qquad (1)$$

where R is at least one selected from the rare earth elements and contains Ce as an essential element, M1 is at least one selected from the group consisting of the group 4 elements and the group 5 elements in the periodic table (excluding Ti), and M2 is at least one selected from the transition metal elements (excluding M1, Ti, Fe, and Mn), Al, B, Ga, Si, and Sn, where the rare earth elements include Sc and Y, and a satisfies 0.003≤a≤0.15, b satisfies 0≤b≤0.20, c satisfies 0.40≤c≤1.15, d satisfies 0.05≤d≤0.40, e satisfies 0≤e≤0.20, f satisfies 0≤f≤0.07, and c +d+e satisfies 0.60≤c+d+e≤1.20.

2. The hydrogen storage material according to claim 1, wherein R of the alloy contains La.

3. The hydrogen storage material according to claim 1, wherein, in a hydrogen pressure-composition isotherm for the alloy at 30° C., a hydrogen absorption pressure $P_{a1}$ at 0.3 wt % of hydrogen and a hydrogen absorption pressure $P_{a2}$ at 1.3 wt % of hydrogen satisfy a relationship of $0 \leq \log_{10}(P_{a2}) - \log_{10}(P_{a1}) \leq 0.45$, and a hydrogen desorption pressure $P_{b1}$ at 0.3 wt % of hydrogen and a hydrogen desorption pressure $P_{b2}$ at 1.3 wt % of hydrogen satisfy a relationship of $0 \leq \log_{10}(P_{b2}) - \log_{10}(P_{b1}) \leq 0.45$.

4. The hydrogen storage material according to claim 1, wherein f satisfies 0.001≤f≤0.05.

5. The hydrogen storage material according to claim 1, wherein f satisfies 0.001≤f≤0.07, and
a+f satisfies 0.005≤a+f≤0.11.

6. The hydrogen storage material according to claim 1, which is formed of a composite obtained by mixing the alloy with a resin.

7. A hydrogen storage container comprising:
the hydrogen storage material according to claim 1.

8. A hydrogen supply apparatus comprising:
the hydrogen storage container according to claim 7.

9. A hydrogen storage container comprising:
the hydrogen storage material according to claim 2.

10. A hydrogen storage container comprising:
the hydrogen storage material according to claim 3.

11. A hydrogen storage container comprising:
the hydrogen storage material according to claim 4.

12. A hydrogen storage container comprising:
the hydrogen storage material according to claim 5.

13. A hydrogen storage container comprising:
the hydrogen storage material according to claim 6.

14. A hydrogen supply apparatus comprising:
the hydrogen storage container according to claim 9.

15. A hydrogen supply apparatus comprising:
the hydrogen storage container according to claim 10.

16. A hydrogen supply apparatus comprising:
the hydrogen storage container according to claim 11.

17. A hydrogen supply apparatus comprising:
the hydrogen storage container according to claim 12.

18. A hydrogen supply apparatus comprising:
the hydrogen storage container according to claim 13.

19. The hydrogen storage material according to claim 4, wherein f satisfies 0.001≤f≤0.05, and a+f satisfies 0.005≤a+f≤0.11.

* * * * *